US008888883B2

(12) United States Patent
Salmona et al.

(10) Patent No.: US 8,888,883 B2
(45) Date of Patent: Nov. 18, 2014

(54) CERAMIC HONEYCOMB STRUCTURES

(75) Inventors: Thierry Salmona, Paris (FR); Carl De Poncins, Paris (FR)

(73) Assignee: Imerys, Paris (FR)

( * ) Notice: Subject to any disclaimer, the term of this patent is extended or adjusted under 35 U.S.C. 154(b) by 0 days.

(21) Appl. No.: 13/636,907

(22) PCT Filed: Mar. 25, 2011

(86) PCT No.: PCT/EP2011/054619
§ 371 (c)(1), (2), (4) Date: Nov. 19, 2012

(87) PCT Pub. No.: WO2011/117385
PCT Pub. Date: Sep. 29, 2011

(65) Prior Publication Data

US 2013/0055694 A1 Mar. 7, 2013

(30) Foreign Application Priority Data

Mar. 26, 2010 (EP) .................................... 10290160

(51) Int. Cl.
*B01D 59/50* (2006.01)
*B01D 50/00* (2006.01)
(Continued)

(52) U.S. Cl.
CPC ........ *B01D 46/2474* (2013.01); *B01D 46/2466* (2013.01); *B01D 46/247* (2013.01);
(Continued)

(58) Field of Classification Search
CPC ............. B01D 46/2466; B01D 46/247; B01D 2046/2437; B01D 2046/2433; B01D 2046/2496; B01D 2279/30; B01D 46/2429; B01D 46/2451; B01D 2046/2481; B01D 46/2444; B01D 2046/2492; B01D 46/2474; C04B 38/0009; Y02T 10/20; F01N 3/0222; F01N 2330/30; F01N 2330/34
USPC .................... 55/522–524, 486; 422/177–182, 422/169–172
See application file for complete search history.

(56) References Cited

U.S. PATENT DOCUMENTS 3,899,326 A * 8/1975 Frost et al. .................... 264/639
4,256,172 A * 3/1981 Rahnke et al. .................... 165/8
(Continued)

FOREIGN PATENT DOCUMENTS

EP 1 479 881 A1 11/2004
EP 1 541 817 A1 6/2005
(Continued)

OTHER PUBLICATIONS

International Search Report and Written Opinion issued Sep. 2, 2011 in International Application No. PCT/EP2011/054619, filed Mar. 25, 2011.

*Primary Examiner* — Amber Orlando
(74) *Attorney, Agent, or Firm* — Finnegan, Henderson, Farabow, Garrett & Dunner, L.L.P.

(57) ABSTRACT

A ceramic honeycomb structure suitable for particulate filters, having an inlet face and an outlet face, comprising a plurality of inlet cells and a plurality of outlet cells extending through the structure from the inlet face to the outlet face, the inlet cells being open at the inlet face and closed where adjoining the outlet face, and the outlet cells being open at the outlet face and closed where adjoining the inlet face. The inlet and/or outlet cells are quadrangular in cross-section and are arranged in an alternating pattern; the outlet cells may have a cross-sectional area generally smaller than that of inlet cells and no point of a given inlet cell is closer to an adjacent inlet cell than to an adjacent outlet cell. A process for preparing the ceramic honeycomb structure is also disclosed.

17 Claims, 3 Drawing Sheets

(51) Int. Cl.

| | |
|---|---|
| ***B01D 39/20*** | (2006.01) |
| ***B01D 39/14*** | (2006.01) |
| ***B01D 39/06*** | (2006.01) |
| ***B01D 24/00*** | (2006.01) |
| ***C04B 38/00*** | (2006.01) |
| ***F01N 3/022*** | (2006.01) |
| *B01D 46/24* | (2006.01) |

(52) U.S. Cl.

CPC ..... *B01D 2046/2437* (2013.01); *C04B 38/0009* (2013.01); *B01D 2046/2433* (2013.01); *B01D 2046/2496* (2013.01); *B01D 2279/30* (2013.01); *B01D 46/2429* (2013.01); *B01D 46/2451* (2013.01); *B01D 2046/2481* (2013.01); *Y02T 10/20* (2013.01); *F01N 3/0222* (2013.01); *F01N 2330/30* (2013.01); *B01D 46/2444* (2013.01); *F01N 2330/06* (2013.01); *B01D 2046/2492* (2013.01); *F01N 2330/34* (2013.01)

USPC .................. 55/486; 55/522; 55/523; 55/524; 422/169; 422/170; 422/171; 422/172; 422/177; 422/178; 422/179; 422/180; 422/181; 422/182

(56) References Cited

U.S. PATENT DOCUMENTS

| | | | | |
|---|---|---|---|---|
| 4,276,071 | A * | 6/1981 | Outland | 55/523 |
| 4,417,908 | A * | 11/1983 | Pitcher, Jr. | 55/523 |
| 5,108,685 | A * | 4/1992 | Kragle | 264/177.12 |
| 5,195,319 | A | 3/1993 | Stobbe | |
| 5,259,190 | A | 11/1993 | Bagley et al. | |
| 6,736,870 | B2 * | 5/2004 | Best et al. | 55/282.3 |
| D538,911 | S * | 3/2007 | Komori et al. | D23/365 |
| 7,208,214 | B2 * | 4/2007 | Ichikawa | 428/116 |
| 7,575,793 | B2 * | 8/2009 | Aniolek et al. | 428/116 |
| 7,655,195 | B1 * | 2/2010 | Ichikawa et al. | 422/180 |
| 7,892,623 | B2 * | 2/2011 | Ohno et al. | 428/116 |
| 8,016,906 | B2 * | 9/2011 | Zawisza | 55/523 |
| 8,057,766 | B2 * | 11/2011 | Ogyu et al. | 423/212 |
| 2003/0000188 | A1 * | 1/2003 | Harada et al. | 55/523 |
| 2004/0128991 | A1 * | 7/2004 | Sakamoto | 60/299 |
| 2005/0066639 | A1 * | 3/2005 | Frost | 55/523 |
| 2005/0180898 | A1 * | 8/2005 | Yamada | 422/180 |
| 2005/0227869 | A1 * | 10/2005 | Ohno et al. | 502/439 |
| 2005/0274097 | A1 * | 12/2005 | Beall et al. | 55/523 |
| 2006/0168927 | A1 * | 8/2006 | Watanable et al. | 55/523 |
| 2007/0105707 | A1 * | 5/2007 | Ichikawa | 501/141 |
| 2008/0085394 | A1 * | 4/2008 | Ohno et al. | 428/117 |
| 2008/0160250 | A1 * | 7/2008 | Adler et al. | 428/116 |
| 2008/0236122 | A1 * | 10/2008 | Ito | 55/523 |
| 2008/0241465 | A1 * | 10/2008 | Ido | 428/116 |

FOREIGN PATENT DOCUMENTS

| | | | | |
|---|---|---|---|---|
| EP | 1 676 622 | A1 | | 7/2006 |
| EP | 1 977 813 | A1 | | 10/2008 |
| GB | 2 064 361 | A | | 6/1981 |
| WO | WO0115877 | | * | 3/2001 |
| WO | WO 03/020407 | A2 | | 3/2003 |

* cited by examiner

CERAMIC HONEYCOMB STRUCTURES

This application is a U.S. national stage entry under 35 U.S.C. §371 from PCT International Application No. PCT/EP2011/054619, filed Mar. 25, 2011, which claims priority to and the benefit of the filing date of EP Application No. 10290160.0, filed Mar. 26, 2010, to both of which this application claims the benefit of priority, and the entirety of the subject matter of both of which is incorporated herein by reference.

FIELD OF THE INVENTION

The present invention relates to ceramic honeycomb structures comprising an alternating pattern of inlet cells and outlet cells of defined shape, to a process for the preparation of these structures, and to their use in exhaust gas particulate filters, such as diesel filters.

BACKGROUND OF THE INVENTION

Ceramic honeycomb structures are commonly used in the art in the manufacture of filters for liquid and gaseous media, and in particular in the manufacture of filters for the removal of fine particles from exhaust gases; the filters are positioned in the exhaust lines of vehicle diesel engines, in order to remove the soot component of the exhausts. These filters can be monoliths or segmented ceramics honeycombs, which comprise cells or channels of dimension commonly ranging from 500 to 2000 microns, with controlled wall porosity. The cells are alternatively plugged on the inlet and outlet side, so that the exhaust gas is forced through the porous ceramic wall between the channels and filtration occurs when the gas crosses the wall.

Suitable honeycomb structures provide a balance of several desirable properties, such as sufficient filtering efficiency, i.e., the exhaust gas passing the filter should be substantially free of diesel particulates; limited pressure drop, i.e. the filter must show a sufficient ability to let the exhaust gas stream pass through its walls; and sufficient chemical resistance against the compounds present in exhaust gas of diesel engines over a broad temperature range.

A low thermal expansion coefficient and a high thermal shock resistance are also desirable, as they can help a filter to survive the several regeneration cycles that it normally undergoes during its lifetime, which involve rapid heating to temperatures substantially higher than the normal operating temperature. In fact, during filtering activities, the inlet channels of the honeycomb structures are progressively filled with soot, thus reducing filtering activities of the structures. Therefore the filter must be regenerated periodically; the cleaning of the filter is performed by heating the filter to a temperature sufficient to ignite the collected diesel particulates at high temperatures (normally higher than 1000° C.), thus causing the combustion of the soot. If filters do not possess sufficient thermal shock resistance, mechanical and/or thermal tensions may cause cracks in the ceramic material, resulting in a decrease or loss of filtering efficiency and consequently of the filter lifetime.

In order to increase the lifetime and their filtering efficiency of the honeycomb filters, various attempts have been made in the art to develop ceramic materials with improved properties, such as of silicon carbide (SIC), mullite, tialite or sillimanite minerals.

Further efforts have been directed to develop asymmetric designs of the cells, where the inlet cells are larger than the outlet cells; two main ways of creating asymmetry have been investigated in the art. The first solution comprises the use of curved walls of the channels, as described for instance in FIG. 6 of EP-A-1 676 622; in these designs the cells, which have normally square or rectangular cross-sections, may be partially deformed to create the asymmetry. As also shown in FIG. 1, all sides of the inlet cells are bulged outwardly (inlet channels are "inflated") while the corresponding sides of the outlet cells are bulged inwardly to give a reduced cross-section area; the result is an undulation of the walls and a bulged pattern having the inlet cells of slightly greater area than the outlet cells. Nevertheless, this design requires the use of complex and costly dies in the manufacture of the filter; moreover, the many constraints accumulated in the structure may lead to problems with the ceramics performance. A further drawback of this solution is that adjacent inlet channels are very close to each other, thus decreasing filtration efficiency. Therefore, these designs have proved shortcomings when used for honeycomb filters, in particular for monolith filters.

A second way of creating asymmetry, known in the art, involves the use inlet channels having a cross-section higher than the cross-section of outlet channels, as shown in FIG. 2. For instance, WO 03/020407 describes a honeycomb structure wherein the cell channels have non-equal, square cross-section. This design has the disadvantage that the distance separating two adjacent inlet squares becomes smaller, thus creating areas of brittleness for the structure which may originate fractures. This drawback may be partly compensated by creating chamfers on the square, therefore creating octagonal cells; nevertheless, the surface of the chamfer leads to a decrease of filtering efficiency, as a significant portion of the inlet cell walls is closer to an adjacent inlet cell than to the nearest outlet cell, which necessitates a longer flow path through the wall.

Therefore, there is a need in the art for a new ceramic honeycomb structure having asymmetric design, able to provide honeycomb filters of increased lifetime and filtering efficiency, at the same time avoiding the problems of the asymmetric designs known in the art.

SUMMARY OF THE INVENTION

The Applicant has unexpectedly found that the above problems are solved by ceramic honeycomb structures having a defined pattern of alternating inlet and outlet cells, of defined cross-sectional shapes. The ceramic honeycomb structures of the invention have an inlet face and an outlet face, comprising a plurality of inlet cells and a plurality of outlet cells extending through the structure from the inlet face to the outlet face, the inlet cells being open at the inlet face and closed where adjoining the outlet face, and the outlet cells being open at the outlet face and closed where adjoining the inlet face.

According to a first aspect, the present invention is directed to a ceramic honeycomb structure wherein:

the inlet and outlet cells are rhombic in cross-section and are arranged in an alternating pattern, and the outlet cells have a cross-sectional area generally smaller than that of inlet cells and have an acute interior angle. The outlet cells may have a diamond cross-section, while the inlet cells may have a diamond or square cross-section. In the ceramic honeycomb structure of this embodiment, preferably no point of a given inlet cell is closer to an adjacent inlet cell than to an adjacent outlet cell.

According to a second aspect, the present invention is directed to a ceramic honeycomb structure wherein:

the inlet and outlet cells are arranged in a checkerboard arrangement, the inlet cells are quadrangular in cross-section; and adjacent inlet cells along a given diagonal of the checkerboard arrangement are rotated relative to one another.

Adjacent inlet cells along a given diagonal of the checkerboard arrangement are angularly offset relative to one another by an angle higher than 1 degree. The outlet cells may have a cross-sectional area generally smaller than the inlet cells. The inlet cells may have a diamond or square cross-section, and preferably have an acute interior angle. In the ceramic honeycomb structure of this embodiment, preferably no point of a given inlet cell is closer to an adjacent inlet cell than to an adjacent outlet cell.

According to a third aspect, the present invention is directed to a ceramic honeycomb structure wherein:

the inlet and outlet cells are quadrangular in cross-section and are arranged in an alternating pattern, and no point of a given inlet cell is closer to an adjacent inlet cell than to an adjacent outlet cell.

In the ceramic honeycomb structures of the invention, the inlet and/or outlet cells may have cross-sectional shapes, such as rhombic or quadrangular, wherein one or more corners are chamfered or rounded.

The specific geometrical configuration of the cells in the honeycomb structures of the invention leads to an improved outlet over inlet ratio, increased cell density, higher filtration surface and improved filtration efficiency; moreover, when no point of a given inlet cell is closer to an adjacent inlet cell than to an adjacent outlet cell, the honeycomb structures show reduced structural failures due to thermal shock.

The present invention also provides a process for preparing a ceramic honeycomb structure comprising the steps of:

(a) providing a green honeycomb structure having an pattern of inlet cells and outlet cells as described in any of the above aspects of the invention;
(b) optionally drying the green honeycomb structure, and
(c) sintering the green honeycomb structure.

In an embodiment of the method of the invention, step (a) comprises providing an extrudable ceramic mixture and extruding the mixture to form the green honeycomb structure.

The present invention also provides a diesel particulate filter comprising one or more ceramic honeycomb structures as described in any of the above aspects of the invention.

DETAILED DESCRIPTION OF THE INVENTION

Figure 1:
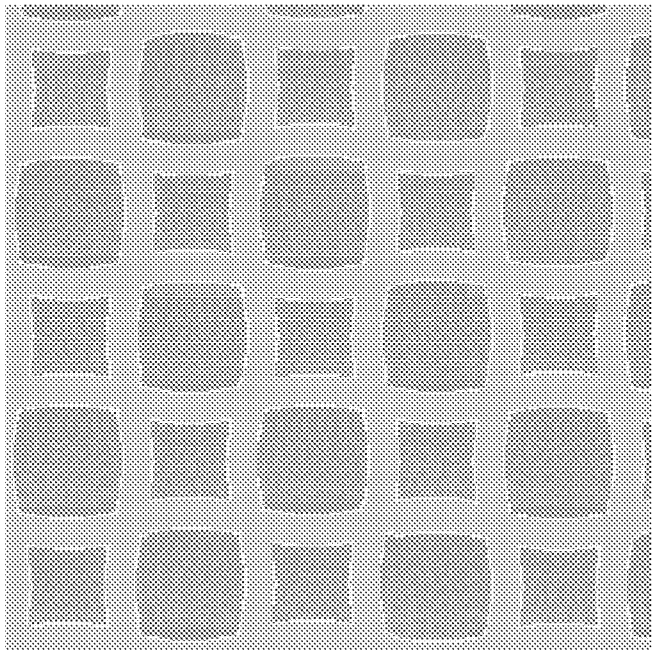
FIGS. 1 and 2 show enlarged schematic plan views of asymmetric designs of inlet and outlet channels not in accordance with the present invention.
Figure 2:
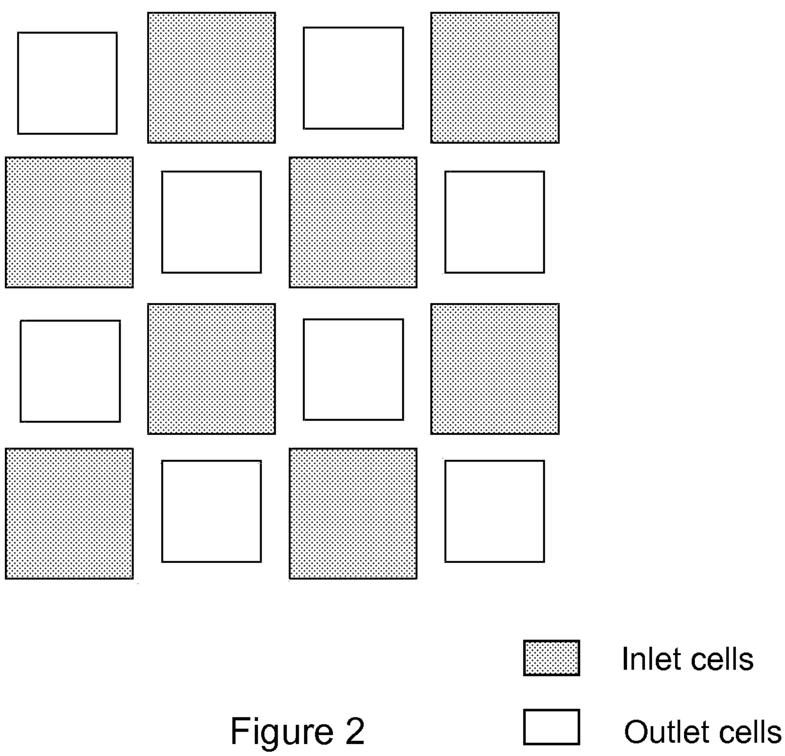

According to a first aspect, the present invention is directed to a ceramic honeycomb structure wherein both inlet and outlet cells are rhombic in cross-section and are arranged in an alternating pattern, wherein the outlet cells have a cross-sectional area generally smaller than that of inlet cells and have an acute interior angle.

The outlet cells have preferably a diamond cross-section with an acute interior angle (α); the inlet cells may have a diamond or square cross-section, and preferably have an acute interior angle (β). In the ceramic honeycomb structure of this embodiment, preferably no point of a given inlet cell is closer to an adjacent inlet cell than to an adjacent outlet cell.

According to a second aspect of the present invention, the outlet and inlet cells are arranged in a checkerboard arrangement; the inlet cells are quadrangular in cross-section and adjacent inlet cells along a given diagonal of the checkerboard arrangement are rotated relative to one another by an angle higher than 1 degree. Adjacent inlet cells along a given diagonal of the checkerboard arrangement are angularly offset by an angle higher than 1 degree; the "angular offset" means the deviation from perpendicular of the diagonals of the adjacent inlet cells. The inlet cells may have a square or diamond cross-section, and preferably have an acute interior angle (β). When the inlet cells have a diamond cross-section, the "angular offset" means the deviation from perpendicular of the two major diagonals of the adjacent inlet cells. By major diagonal of a cell there is meant the longer of the two diagonals of the cell. Preferably, the major diagonals of adjacent inlet cells along a given diagonal of the checkerboard arrangement are angularly offset by 1 to 30 degrees, or by 3 to 20 degrees.

The outlet cells may have a cross-sectional area generally smaller than the inlet cells. The outlet cells can be square, rectangular, octagonal, polygonal or any other shape or combination of shapes that are suitable for arrangement in a repeating pattern; the outlet cells are preferably quadrangular in cross-section. The outlet cells may have an acute interior angle (α), preferably smaller than (β); adjacent inlet cells along a given diagonal of the checkerboard arrangement may be angularly offset by an angle equal to 90−(α). In the ceramic honeycomb structure of this embodiment, preferably no point of a given inlet cell is closer to an adjacent inlet cell than to an adjacent outlet cell.

According to a third aspect of the present invention, the inlet and outlet cells are quadrangular in cross-section and are arranged in an alternating pattern, and no point of a given inlet cell is closer to an adjacent inlet cell than to an adjacent outlet cell.

In the ceramic honeycomb structures of any of the aspects of the invention as described above, the cross-sectional shapes of the inlet and/or outlet cells may have one or more chamfered or rounded corners.

The cross-sectional shape of the cells for obtaining the configurations of any of the aspects of the invention described above is not especially limited; examples of cells cross-sectional shapes include rhombus and rectangle. By "rhombus" is meant a quadrilateral with all the sides equal, like a square or a diamond.

The inlet and outlet cells have preferably a diamond cross-section, wherein outlet cells have an acute angle (α) and inlet cells have an acute angle (β), separated by straight walls. The diamonds are preferably organized so that four (α) diamonds delimitate between themselves a (β) diamond, and vice versa. (β) is preferably higher than (α). The outlet cells may have an acute interior angle (α) ranging from 50 to 85 degrees, preferably from 60 to 85 degrees.

In the ceramic honeycomb structures of any of the above aspects of the invention, the surface of filtration per volume of filter, expressed in $mm^2/mm^3$ may be comprised between 0.8 and 1.

The aperture ratio, defined as the surface of cross section of inlet channels with respect to the total surface of cross section of the filter, may be higher than 35%; the aperture ratio is preferably smaller than 45%. This ratio is typically measured by dividing the surface of the inlet channels in one elementary cell of the filter (that is reproduced as many times as necessary to represent the global surface of the filter) by the surface of such elementary cell, multiplied by 100.

The ceramic honeycomb structures of any of the above aspects of the invention have a coefficient of thermal expansion that may be comprised between 0 and $9\cdot10^{-6}$ $K^{-1}$, or between $4.5\cdot10^{-6}$ and $7\cdot10^{-6}$ $K^{-1}$, measured by dilatometry according to DIN 51045.

Figure 3:
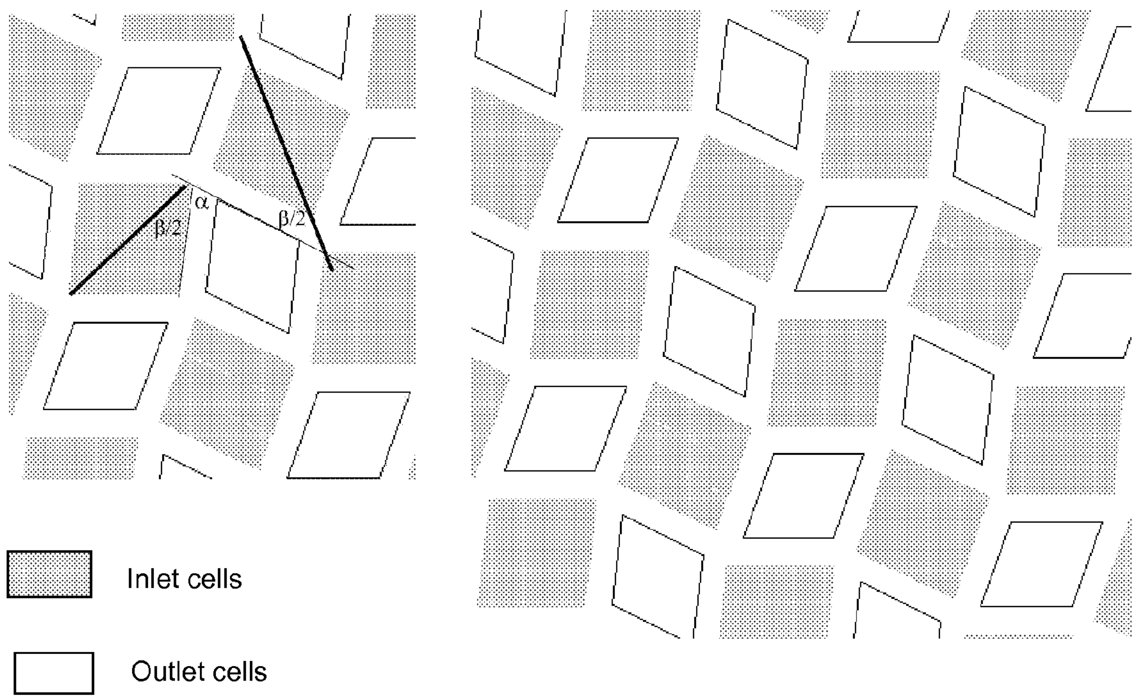
FIGS. 3-6 are enlarged schematic plan views of the asymmetric designs of inlet and outlet channels in the ceramic honeycomb structures of the invention.
Figure 4:
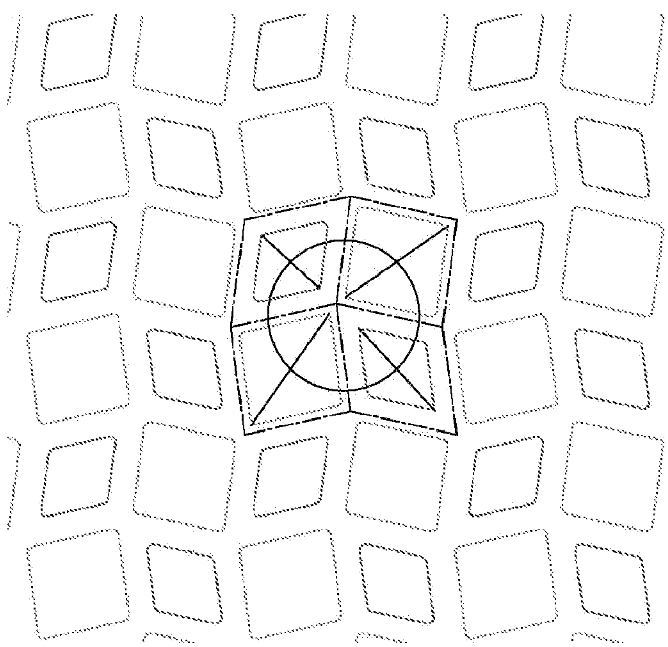

FIGS. 3 and 4 show variations in the arrangement of inlet and outlet cells according to the invention, although numerous other configurations may be utilised. The description of the cells pattern is given as they would be viewed in a plane extending normal to the longitudinal axis of the honeycomb structure. The inlet cells are shaded to indicate that they are blocked at their outlet ends, while the outlet passages are clear to indicate that they are open at their outlet ends. The honeycomb structure may be a cylindrical body having a circular outer bounding wall; the outer bounding wall may take any desired curvilinear or geometric configuration, such as elliptical, oval, rectangular, triangular or the like.

FIG. 3 shows a schematic cross-sectional view of a portion of a honeycomb structure in which inlet and outlet cells are rhombic in shape. Inlet cells have an acute interior angle ($\beta$) of 84 degrees, while outlet cells have an acute interior angle ($\alpha$) of 69 degrees; therefore, ($\beta$) is higher than ($\alpha$).

In the embodiment of FIG. 4, both inlet and outlet cells have rhombic cross sections with rounded corners, and are arranged in a checkerboard pattern, as viewed in cross section. Inlet cells have an acute interior angle ($\beta$) of 83 degrees, while outlet cells have an acute interior angle ($\alpha$) of 70 degrees; therefore, ($\beta$) is higher than ($\alpha$). The inlet and outlet cells are arranged in vertical and horizontal rows, with the inlet cells alternating with outlet cells in a checkerboard pattern. Each interior wall portion of the honeycomb structure lies between an inlet cell and an outlet cell at every point of its surface except where it engages another wall, as it does at the corners of the cell; therefore, except for the corner engagement, the inlet cells are spaced from one another by intervening outlet cells and vice versa. The major diagonals of adjacent inlet cells disposed along a given diagonal of the checkerboard arrangement are angularly offset by an angle of 20 degrees, i.e. 90–($\alpha$). As indicated above, "angular offset" means the deviation from perpendicular of the diagonals of the adjacent inlet cells.

The new cell configuration of the ceramic honeycomb structures of the invention provide more degrees of freedom and better possibility to adapt the filter to the requirements imposed by the filtering purpose, and in particular the thickness of the cell walls, the acute interior angle ($\alpha$) of the outlet cells, the acute interior angle ($\beta$) of the inlet cells and the distance between adjacent inlet cells. The new cell configuration also offers the advantages of an increased cell density (measured as number of cells per square centimetre, or as number of cells per square inch cpsi) for a given cell inlet cross-sectional area, and increased aperture ratio. In particular, the smaller the ($\alpha$) and ($\beta$) angles, the larger the cell density for a given length of the side of the diamonds. The larger the ($\beta$) to ($\alpha$) ratio, the larger the outlet over inlet ratio of the honeycomb structure.

Moreover, the solution of the invention avoids the use of chamfers, thus avoiding any the loss of filtration area. The entire wall surface is available for filtration, since no point of a given inlet channel is closer to another inlet channel than the closest point of the adjacent outlet channel. The flow is channelled in a trapezoidal shape from the inlet channels to the outlet channels.

Moreover, the ceramic honeycomb structures of the invention can have a very homogeneous wall thickness. The parameters of the cell configuration can be easily adjusted so that wall thickness is constant in the whole design. This allows to obtain a structure without points of specific wall accumulation (increased thickness), that could generate discontinuities in the exhaust flow and consequent soot accumulation, as well as specific hot points during the regeneration phase.

In the honeycomb structures of the invention, the inlet and outlet cells side by side in a longitudinal direction may be separated by porous walls and plugged in an alternating fashion as indicated above. The interior walls of the honeycomb structure may be porous, so as to permit the passage of exhaust gases through the walls from the inlet to the outlet cells. The porosity of the walls is sized appropriately to filter out a substantial portion of the particulates present in exhaust gases.

The ceramic honeycomb structure of the invention may have a total porosity in the range between 20 and 80%, or between 35 and 70%, measured by mercury porosimetry (the volume percentages are calculated on the basis of the total volume of mineral phases and pore space). Porosity is determined by mercury diffusion as measured using a Thermo Scientific Mercury Porosimeter—Pascal 140, with a contact angle of 130 degrees. The pore diameter $d_{50}$, measured by mercury porosimetry, may be in the range of 1 to 60 microns, or 5 to 50 microns, or 8 to 30 microns. Depending on the intended use of the ceramic honeycombs, in particular with regard to the question whether the ceramic honeycomb structure is further impregnated, e.g., with a catalyst, the above values may be varied. For non-impregnated ceramic honeycomb structures, the pore diameter is usually in the range between 10 and 20 microns, while for impregnated structures, the range is usually between 20 and 25 microns prior to impregnating. The catalyst material deposited in the pore space will result in a reduction of the original pore diameter.

An average cell density of the honeycomb filter of the present invention is not limited. The ceramic honeycomb structure may have a cell density between 6 and 2000 cells/square inch (0.9 to 311 cells/$cm^2$), or between 50 and 1000 cells/square inch (7.8 to 155 cells/$cm^2$), or between 100 and 400 cells/square inch (15.5 to 62.0 cells/$cm^2$). Cell density is defined as the ratio between the surface of the inlet or outlet of the filter, once sintered, divided by the surface of two inlet and two outlet channels and associated walls, this ratio being in turn multiplied by 4. The associated walls are the walls adjacent to the cells, chosen so that the elementary drawing made of the inlet and outlet cells and associated walls can be reproduced as much as needed by translation to form the checkerboard arrangement.

The thickness of the partition wall separating adjacent cells in the present invention is not limited. The thickness of the partition wall may range from 100 to 500 microns, or from 200 to 450 microns.

Moreover, the outer peripheral wall of the structure is preferably thicker than the partition walls, and its thickness may be in a range of 100 to 700 microns, or 200 to 400 microns. The outer peripheral wall may be not only a wall formed integrally with the partition wall at the time of the forming but also a cement coated wall formed by grinding an outer periphery into a predetermined shape.

The cells may have a surface roughness Ra comprised between 1 and 100 microns, or 10-50 microns, as measured in accordance with JIS B 0601 (1994).

In the present invention, the material constituting the honeycomb structure is not limited; the honeycomb structure of the invention may be formed of any suitable ceramic material. Suitable ceramic materials comprise silicon carbide (SiC), silicon nitride, mullite, cordierite, zirconia, titania, silica, magnesia, alumina, spinel, tialite, kyanite, sillimanite, andalusite, lithium aluminum silicate, aluminum titanate and mixtures thereof. The ceramic material may contain metals, such as Fe—Cr—Al-based metal, metal silicon and the like.

According to a preferred embodiment, the ceramic material comprises a high amount of a mullite phase in combination with a minor amount of tialite (i.e., the mullite phase is the dominant phase), as described in WO 2009/076985, the content of which is incorporated herein by reference; this ceramic material provides increased mechanical strength and high thermal shock resistance.

The ceramic honeycomb structures may comprise a mineral phase of mullite and a mineral phase of tialite, wherein the volume ratio of mullite to tialite is ≥2:1, or ≥4:1, or ≥10:1. The tialite phase may be enclosed by the mullite phase, and may be in the form of crystals substantially parallel. The amount of mullite in the ceramic honeycomb structure may be greater than 50%, or greater than 75%, even or greater than 80%, by volume (calculated on the basis of the total volume of the mineral phases of the honeycomb).

The ceramic honeycomb structures may comprise a mineral phase consisting of andalusite; the andalusite phase may be present in an amount from 0.5% to less than 50%, or 5% to 30%, or 0.5% to 15% by volume (based on the volume of the solid phases of the ceramic honeycomb structure). A suitable andalusite-containing ceramic honeycomb structure comprises:

0.5 to 15.0%, or 5.0 to 8.0% of andalusite;
60.0 to 90.0%, or 75.0 to 90.0% of mullite;
2.5 to 20.0%, or 4.0 to 7.0%, of tialite;
0 to 2.0% of rutile and/or anatase; and
3.0 to 20.0% of an amorphous silica phase;

wherein the total amount of the above components is 100% by volume (based on the volume of the solid compounds).

The material of the sealing portion formed by sealing the cells is not limited, but the material preferably contains one or more ceramics and/or metals selected from the ceramics and metals described above as preferable for the partition wall of the honeycomb structure.

The method for producing the above ceramic honeycomb structures, according to the invention, comprises the steps of:

(a) providing a green honeycomb structure having an alternating pattern of inlet cells and outlet cells as described above;
(b) optionally drying the green honeycomb structure, and
(c) sintering the green honeycomb structure.

Step (a) may comprise providing an extrudable ceramic mixture and extruding the mixture to form the green honeycomb structure.

The extrudable mixture or the green honeycomb structure may comprise one or more binding agents; the function of the binding agent is to provide a sufficient mechanical stability of the green honeycomb structure in the process steps before the heating or sintering step. Suitable binding agents may be selected from the group consisting of methyl cellulose, hydroxymethylpropyl cellulose, polyvinyl butyrals, emulsified acrylates, polyvinyl alcohols, polyvinyl pyrrolidones, polyacrylics, starch, silicon binders, polyacrylates, silicates, polyethylene imine, lignosulfonates, alginates and mixtures thereof. The binding agents can be present in a total amount between 1.5% and 15% by weight, or between 2% and 9% by weight (based on the dry weight of the extrudable mixture or the green honeycomb structure).

The extrudable mixture or the green honeycomb structure may comprise one or more mineral binders; suitable mineral binder may be selected from the group including, but not limited to, bentonite, aluminum phosphate, boehmite, sodium silicates, boron silicates and mixtures thereof.

The extrudable mixture or the green honeycomb structure may comprise one or more auxiliants, which provide the raw material with advantageous properties for the extrusion step (plasticizers, glidants, lubricants, and the like). Suitable auxiliants may be selected from the groups consisting of polyethylene glycols (PEGs), glycerol, ethylene glycol, octyl phthalates, ammonium stearates, wax emulsions, oleic acid, Manhattan fish oil, stearic acid, wax, palmitic acid, linoleic acid, myristic acid, lauric acid and mixtures thereof. The auxiliants can be present in a total amount between 1.5% and 15% by weight, or between 2% and 9% by weight (based on the dry weight of the extrudable mixture or the green honeycomb structure; if liquid auxiliants are used, the weight is included into the dry weight of the extrudable mixture or the green honeycomb structure). The "dry weight" of the extrudable mixture or of the green honeycomb structure refers to the total weight of any compounds discussed herein to be suitable to be used in the extrudable mixture, i.e., the total weight of the mineral phases and of the binders/auxiliants. The "dry weight" is thus understood to include such auxiliants that are liquid under ambient conditions, but it does not include water in aqueous solutions of minerals, binders or auxiliants if such are used to prepare the mixture.

The preparation of an extrudable mixture from the mineral compounds (optionally in combination with binders and/or auxiliants) is performed according to methods and techniques known in the art. The raw materials can be mixed in a conventional kneading machine with the addition of a sufficient amount of a suitable liquid phase as needed (normally water), to obtain a paste suitable for extrusion. Additionally, conventional extruding equipment (such as, e.g., a screw extruder) and dies for the extrusion of honeycomb structures known in the art can be used. A summary on the technology is given in the textbook of W. Kollenberg (ed.), Technische Keramik, Vulkan-Verlag, Essen, Germany, 2004, which is incorporated herein by reference.

The diameter and arrangement of the green honeycomb structures can be determined by selecting extruder dies of desired size and shape. The honeycomb structure can be made using extrusion dies having pins arranged in a quadrangular symmetry. The corners of the pins may or may not be rounded.

After extrusion, the extruded mass is cut into pieces of suitable length to obtain green honeycomb structures of desired format. Suitable cutting means for this step (such as wire cutters) are known to the person skilled in the art.

In optional step (b) of the method of the invention, the extruded green honeycomb structure can be dried according to methods known in the art (e.g., microwave drying, hot-air drying) prior to sintering. Alternatively, the drying step can be performed by exposing the green honeycomb structure to an atmosphere with controlled humidity, at predefined temperatures in the range between 20° C. and 90° C. over an extended period of time in a climate chamber, where the humidity of the surrounding air is reduced in a step-by-step manner, while the temperature is correspondingly increased. For example, one drying program for the green honeycomb structures of the present invention is as follows:

maintaining a relative air humidity of 70% at room temperature for 48 hours;
maintaining a relative air humidity of 60% at 50° C. for 3 hours;
maintaining a relative air humidity of 50% at 75° C. for 3 hours; and
maintaining a relative air humidity of 50% at 85° C. for 12 hours.

The dried green honeycomb structure may be then heated in a conventional oven or kiln for the preparation of ceramic materials. Generally, any oven or kiln that is suitable to subject the heated objects to a predefined temperature is suitable for the process of the invention.

When the green honeycomb structure comprises organic binder compound and/or organic auxiliants, usually the structure is heated to a temperature in the range between 200° C. and 300° C. prior to heating the structure to the final sintering temperature, and that temperature is maintained for a period of time that is sufficient to remove the organic binder and auxiliant compounds by means of combustion (for example, between one and three hours).

The sintering step (c) may be carried out at a temperature between 1250° C. and 1700° C., or between 1350° C. and 1600° C., or between 1400° C. and 1580° C., or between 1400° C. and 1500° C. According to an embodiment, the method comprises the step of heating the green honeycomb structure to a temperature in the range of between 650° C. and 950° C., or between 700° C. and 900° C., or between 800° C. and 850° C. prior to the sintering step.

For the use as diesel particulate filters, the ceramic honeycomb structures of the present invention, or the green ceramic honeycomb structures can be further processed by plugging, i.e., by closing certain open structures of the honeycomb at predefined positions with additional ceramic mass. Plugging processes thus include the preparation of a suitable plugging mass, applying the plugging mass to the desired positions of the ceramic or green honeycomb structure, and subjecting the plugged honeycomb structure to an additional sintering step, or sintering the plugged green honeycomb structure in one step, wherein the plugging mass is transformed into a ceramic plugging mass having suitable properties for the use in diesel particulate filters. It is not required that the ceramic plugging mass is of the same composition as the ceramic mass of the honeycomb body. Generally, methods and materials for plugging known to the person skilled in the art may be applied for the plugging of the honeycombs of the present invention.

The plugged ceramic honeycomb structure may then be fixed in a box suitable for mounting the structure into the exhaust gas line of a diesel engine.

Another object of the present invention is a particulate filter comprising one or more ceramic honeycomb structures as indicated above; the filter may be for instance a diesel particulate filter or a filter for selective catalytic reduction for the removal of NOx from exhaust gases.

The particulate filter may be formed by one ceramic honeycomb structure of the invention, in the form of a monolith, or may be constituted of a plurality of integrated structures. In the latter case, where the honeycomb filter is segmented and then integrated, a size or shape of each structure is not limited; the cross-sectional area of each structure may range between 900 and 10000 $mm^2$, or between 900 and 5000 $mm^2$, or between 900 and 3600 $mm^2$. As a preferable shape of the structure, for example, the cross-sectional shape is quadrangular. The whole cross-sectional shape of the particulate filter is not especially limited, and may be circular, elliptic, quadrangular and polygonal in shape. To form the particulate filter into a constitution in which a plurality of structures are integrated, after obtaining the structures as indicated above, the structures can be bonded using, for example, ceramic cement, and dried/hardened to obtain the filter.

EXAMPLES

The following examples, which are not intended to limit the scope of the present invention, illustrate the advantages obtained with the cell geometry of the honeycomb structures of the invention over that of the prior art.

Example 1

Figure 5:
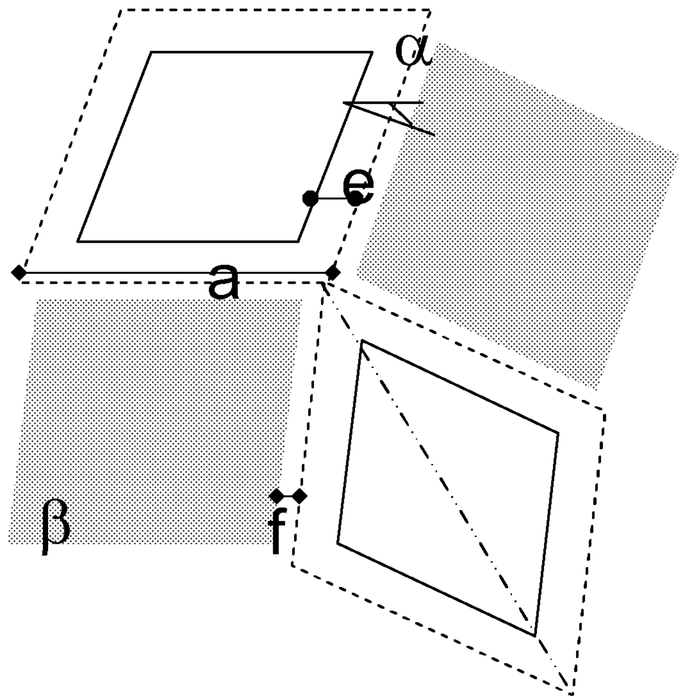

Honeycomb structures according to the invention, having a configuration according to the parameters reported in Table 1, were evaluated; the meaning of the parameters α, β, a, e, f is evident from FIG. 5. The side of the inlet diamond may be calculated as (a−2f), while the side of the outlet diamond may be calculated as (a−2e).

TABLE 1

| α [deg] | β [deg] | a [μm] | e [μm] | f [μm] | Inlet [%] | Outlet [%] | Walls [%] | Cell density [cell/cm²] (cpsi) | Outlet hydraulic diameter [μm] | Filtration surface [mm/mm²] |
|---|---|---|---|---|---|---|---|---|---|---|
| 60 | 90 | 1800 | 305 | 153 | 36.92 | 20.3 | 42.8 | 33 (213) | 1031 | 0.99 |
| 60 | 85 | 1800 | 305 | 153 | 36.85 | 20.3 | 42.8 | 33 (214) | 1031 | 0.99 |
| 60 | 70 | 1800 | 304 | 150 | 36.11 | 21.0 | 42.9 | 34 (221) | 1032 | 1.03 |
| 60 | 65 | 1800 | 302 | 149 | 35.65 | 21.6 | 42.8 | 35 (225) | 1036 | 1.05 |
| 60 | 60 | 1800 | 301 | 147 | 35.03 | 22.1 | 42.8 | 36 (230) | 1037 | 1.07 |
| 65 | 90 | 1800 | 300 | 154 | 36.01 | 21.1 | 42.9 | 32 (209) | 1088 | 0.97 |
| 65 | 85 | 1800 | 299 | 154 | 35.99 | 21.2 | 42.8 | 32 (209) | 1089 | 0.97 |
| 65 | 70 | 1800 | 298 | 152 | 35.15 | 22.0 | 42.9 | 33 (216) | 1091 | 1.00 |
| 65 | 65 | 1800 | 297 | 150 | 34.69 | 22.4 | 42.9 | 34 (220) | 1093 | 1.02 |
| 70 | 90 | 1800 | 296 | 156 | 35.26 | 21.8 | 42.9 | 32 (205) | 1135 | 0.95 |
| 70 | 85 | 1800 | 295 | 155 | 35.24 | 21.9 | 42.8 | 32 (206) | 1137 | 0.95 |
| 70 | 70 | 1800 | 294 | 153 | 34.40 | 22.7 | 42.9 | 33 (212) | 1139 | 0.98 |

TABLE 1-continued

| α [deg] | β [deg] | a [μm] | e [μm] | f [μm] | Inlet [%] | Outlet [%] | Walls [%] | Cell density [cell/cm²] (cpsi) | Outlet hydraulic diameter [μm] | Filtration surface [mm/mm²] |
|---|---|---|---|---|---|---|---|---|---|---|
| 75 | 90 | 1800 | 292 | 157 | 34.71 | 22.4 | 42.9 | 31 (203) | 1175 | 0.93 |
| 75 | 85 | 1800 | 290 | 155.7 | 34.72 | 22.6 | 42.7 | 31 (203) | 1178 | 0.94 |

In the following Table 2, honeycomb configurations according to the present invention were compared to the square design of the prior art, wherein (α) and (β) are 90 degrees.

TABLE 2

| α [deg] | β [deg] | a [μm] | e [μm] | f [μm] | Inlet [%] | Outlet [%] | Walls [%] | Wall thickness [μm] | Cell density [cell/cm²] (cpsi) | filtration surface [mm/mm²] |
|---|---|---|---|---|---|---|---|---|---|---|
| 65 | 90 | 1800 | 299 | 154 | 36.03 | 21.2 | 42.8 | 426 | 32 (209) | 0.97 |
| 90 | 90 | 1800 | 288 | 157 | 34.05 | 23.2 | 42.8 | 445 | 31 (199) | 0.92 |
| 65 | 80 | 1800 | 299 | 153 | 35.83 | 21.4 | 42.8 | 422 | 33 (211) | 0.97 |
| 65 | 90 | 1800 | 316 | 163 | 35.18 | 20.0 | 44.8 | 450 | 32 (209) | 0.95 |
| 90 | 90 | 1800 | 290 | 159 | 33.88 | 22.9 | 43.2 | 450 | 31 (199) | 0.91 |
| 65 | 80 | 1800 | 319 | 164 | 34.87 | 20.0 | 45.1 | 450 | 33 (211) | 0.96 |

In Table 2, the honeycomb configurations of the three first lines were made at constant cross section surface of the wall, while the honeycomb configurations of the last three lines were made at constant wall thickness. As evident from the above table, the honeycomb configurations according to the present invention wherein (α) is 65 degrees and (β) is 90 or 80 degrees offer a much higher filtration surface with respect to the square design of the prior art. Moreover, as evident from Table 2, the honeycomb configurations of the invention offer improved asymmetry ratio and higher cell density, thus providing improved filtration surface.

The above examples demonstrate that the honeycomb configurations according to the present invention are able to deliver suitable asymmetry ratios with outlet hydraulic diameter around 1000 microns and filtration surface even higher than 0.98. The above examples also show the degrees of freedom offered by the honeycomb structure configuration of the present invention; in particular, once the space devoted to the wall has been determined, inlet and outlet areas may be easily adjusted by varying (α) and (β) angles. In comparison with the chamfered designs of the prior art, the honeycomb structure configuration of the present invention allow to obtain increased filtration area and filtration efficiency, since there is no loss in the filtration efficiency due to the chamfers.

Finally, honeycomb configurations according to the present invention, wherein no point of a given inlet cell is closer to an adjacent inlet cell than to an adjacent outlet cell are obtained when the following inequalities (1) and (2) are fulfilled:

$$f>e(1-\cos\alpha)/(1+\cos\beta) \quad (1) \text{ and}$$

$$f>e(1+\cos\alpha)/(1-\cos\beta) \quad (2)$$

Example 2

Figure 6:
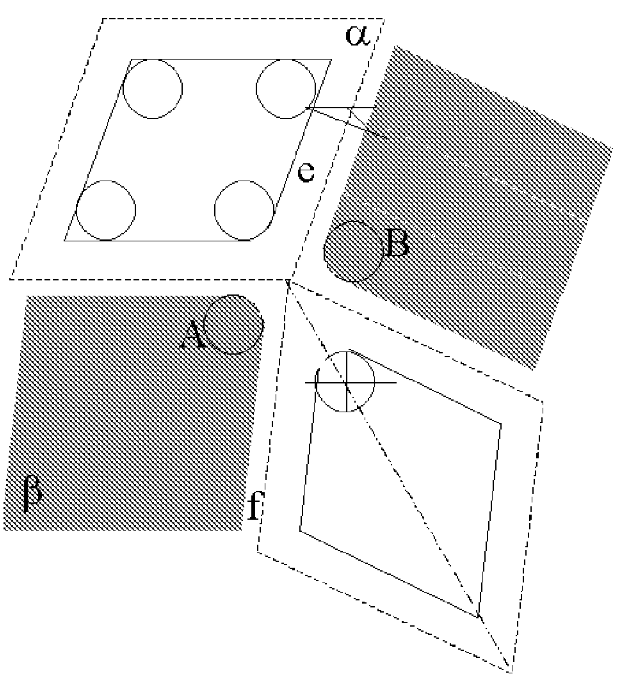

Honeycomb structures according to the invention, wherein inlet and outlet cells had rounded angles, were evaluated; the honeycomb configurations and the parameters α, β, a, e and f are reported in Table 3 and FIG. 6. These honeycomb structures offer manufacturing advantages, since electrodes having variable diameters A and B may be used for the preparation of the asymmetric cells; in the embodiments of the invention, the radius of both electrodes A and B was 100 microns,

TABLE 3

| α [deg] | β [deg] | a [μm] | e [μm] | f [μm] | Inlet [%] | Outlet [%] | Walls [%] | Wall thickness [μm] | Cell density [cell/cm²] (cpsi) | Outlet hydraulic diameter [μm] | Filtration surface [mm/mm²] |
|---|---|---|---|---|---|---|---|---|---|---|---|
| 60 | 90 | 1800 | 339 | 127 | 39.39 | 17.8 | 42.8 | 420 | 33 (213) | 1027 | 0.99 |
| 60 | 85 | 1800 | 339 | 161 | 39.36 | 17.8 | 42.8 | 419 | 33 (214) | 1026 | 1.00 |
| 60 | 70 | 1800 | 341 | 119 | 38.98 | 18.2 | 42.8 | 408 | 34 (221) | 1022 | 1.03 |
| 60 | 65 | 1800 | 343 | 114 | 38.73 | 18.5 | 42.8 | 401 | 35 (225) | 1019 | 1.05 |
| 60 | 60 | 1800 | 345 | 108 | 38.42 | 18.8 | 42.8 | 392 | 36 (230) | 1016 | 1.08 |
| 65 | 90 | 1800 | 332 | 128 | 38.47 | 18.7 | 42.8 | 429 | 32 (209) | 1079 | 0.97 |

TABLE 3-continued

| α [deg] | β [deg] | a [μm] | e [μm] | f [μm] | Inlet [%] | Outlet [%] | Walls [%] | Wall thickness [μm] | Cell density [cell/cm²] (cpsi) | Outlet hydraulic diameter [μm] | Filtration surface [mm/mm²] |
|---|---|---|---|---|---|---|---|---|---|---|---|
| 65 | 85 | 1800 | 332 | 127 | 38.46 | 18.7 | 42.8 | 428 | 32 (209) | 1078 | 0.97 |
| 65 | 70 | 1800 | 335 | 120 | 38.04 | 19.2 | 42.8 | 416 | 33 (216) | 1074 | 1.01 |
| 65 | 65 | 1800 | 336 | 115 | 37.78 | 19.4 | 42.8 | 409 | 34 (220) | 1072 | 1.03 |
| 70 | 90 | 1800 | 327 | 128 | 37.77 | 19.4 | 42.8 | 436 | 32 (205) | 1121 | 0.96 |
| 70 | 85 | 1800 | 327 | 128 | 37.72 | 19.5 | 42.8 | 435 | 32 (206) | 1121 | 0.96 |
| 70 | 70 | 1800 | 330 | 121 | 37.31 | 19.9 | 42.8 | 423 | 33 (212) | 1117 | 0.99 |
| 85 | 90 | 1800 | 320 | 129 | 36.59 | 20.6 | 42.8 | 448 | 31 (200) | 1194 | 0.93 |
| 85 | 85 | 1800 | 320 | 128.9 | 36.57 | 20.6 | 42.8 | 447 | 31 (200) | 1193 | 0.93 |

The above configurations, wherein the overall space devoted to the walls was maintained constant, gave larger inlet channel with respect to the corresponding structures with sharp angles. The configurations wherein (α) was 65 degrees and (β) was 70, 75 or 85 degrees gave the best balance of high filtration surface, high cell density and improved outlet over inlet ratio.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A ceramic honeycomb structure having an inlet face and an outlet face, comprising a plurality of inlet cells and a plurality of outlet cells extending through the structure from the inlet face to the outlet face, the inlet cells being open at the inlet face and closed where adjoining the outlet face, and the outlet cells being open at the outlet face and closed where adjoining the inlet face, wherein:

- the inlet and outlet cells are arranged in a checkerboard arrangement,
- the inlet cells are quadrangular in cross-section; and
- adjacent inlet cells along a given diagonal within the checkerboard arrangement are rotated relative to one another.

2. The ceramic honeycomb structure of claim 1, wherein adjacent inlet cells along a given diagonal of the checkerboard arrangement are rotated relative to one another by an angle higher than 1 degree.

3. The ceramic honeycomb structure according to claim 1, wherein no point of a given inlet cell is closer to an adjacent inlet cell than to an adjacent outlet cell.

4. The ceramic honeycomb structure according to claim 1, wherein the surface of filtration per volume of filter ranges from 0.8 to 1 $mm^2/mm^3$.

5. The ceramic honeycomb structure according to claim 1, wherein the aperture ratio is higher than 35%.

6. The ceramic honeycomb structure according to claim 1, wherein the outlet cells have an acute interior angle (α) ranging from 50 to 85 degrees.

7. The ceramic honeycomb structure according to claim 1, wherein the inlet cells have an acute interior angle (β) and the outlet cells have an acute interior angle (α), and (β) is higher than (α).

8. The ceramic honeycomb structure according to claim 1, wherein quadrangular cells have one or more chamfered or rounded corners.

9. The ceramic honeycomb structure according to claim 1, wherein adjacent cells are separated by partition walls having a thickness ranging from 100 to 500 microns.

10. The ceramic honeycomb structure according to claim 1, comprising one or more minerals selected from the group consisting of silicon carbide (SiC), silicon nitride, mullite, cordierite, zirconia, titania, silica, magnesia, alumina, spinel, tialite, kyanite, sillimanite, andalusite, lithium aluminum silicate, and aluminum titanate.

11. The ceramic honeycomb structure according to claim 1, having a coefficient of thermal expansion ranging from 0 to $9\cdot10^{-6}K^{-1}$.

12. The ceramic honeycomb structure according to claim 1, wherein the cells have a surface roughness Ra ranging from 1 to 100 microns.

13. The ceramic honeycomb structure according to claim 1, having a total porosity ranging from 20 to 80%.

14. The ceramic honeycomb structure according to claim 1, having pore diameter $d_{50}$ ranging from 1 to 60 microns.

15. A process for preparing a ceramic honeycomb structure according to claim 1, the method comprising:

- providing a green honeycomb structure having a pattern of inlet cells and outlet cells according to claim 1;
- optionally drying the green honeycomb structure; and
- sintering the green honeycomb structure.

16. The method according to claim 15, wherein providing a green honeycomb structure comprises providing an extrudable ceramic mixture and extruding the mixture to form the green honeycomb structure.

17. A particulate filter comprising one or more ceramic honeycomb structures according to claim 1.

* * * * *